Dec. 20, 1949  M. N. FAIRBANK  2,491,719
SELF-DEVELOPING CAMERA
Filed Nov. 26, 1948  2 Sheets-Sheet 1

INVENTOR
Merry N. Fairbank
BY Donald L. Brown
and Oliver W. Hayes
Attorneys

Dec. 20, 1949  M. N. FAIRBANK  2,491,719
SELF-DEVELOPING CAMERA
Filed Nov. 26, 1948  2 Sheets-Sheet 2
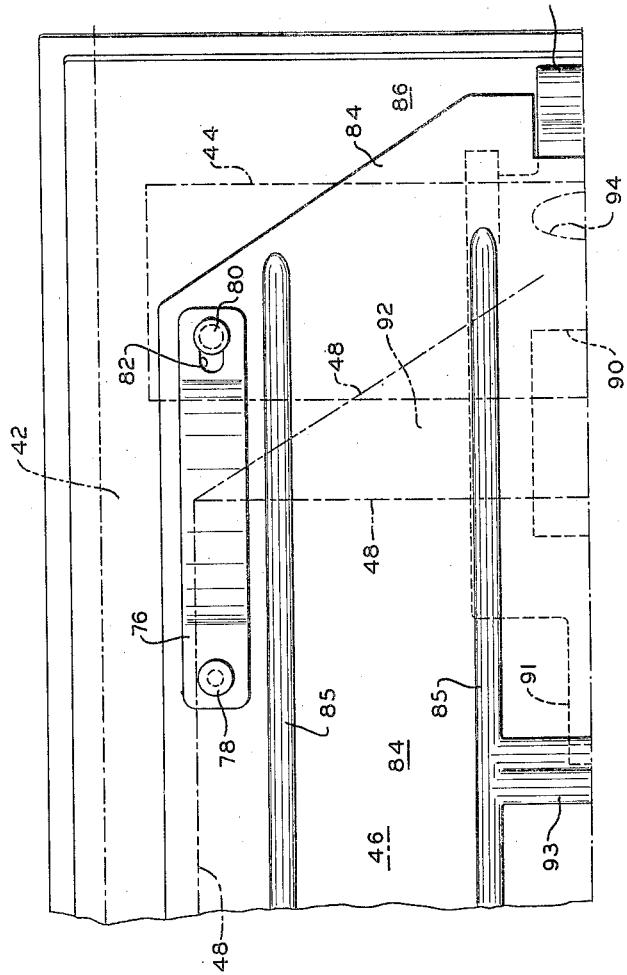
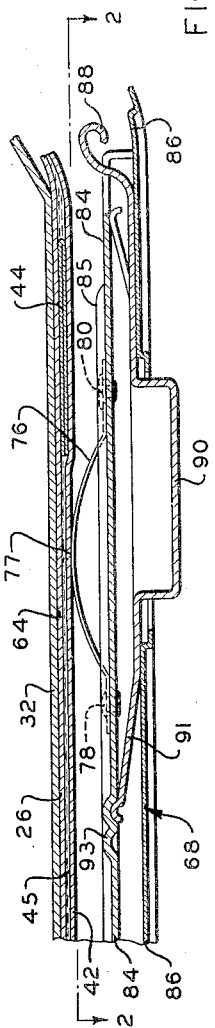
INVENTOR
Murry N. Fairbank
BY Donald L. Brown
and Oliver W. Hayes
Attorneys Patented Dec. 20, 1949

2,491,719

UNITED STATES PATENT OFFICE 2,491,719

SELF-DEVELOPING CAMERA

Murry N. Fairbank, Belmont, Mass., assignor to Polaroid Corporation, Cambridge, Mass., a corporation of Delaware Application November 26, 1948, Serial No. 62,186

7 Claims. (Cl. 95—13)

This invention relates to photography and more particularly to novel photographic apparatus, such as a camera, wherein negative and positive images may be concurrently produced by having negative and positive sheets in face-to-face relation and releasing a liquid from a container carried by one of said sheets and spreading said liquid between the two sheets. In a preferred form of camera there is provided a dark chamber in the rear of the camera into which the processed sheets are fed, the image-forming reactions being carried out while the sheets remain in this dark chamber. This application is in part a continuation of the copending application of Joseph F. Carbone and Murry N. Fairbank, Serial No. 780,344, filed October 17, 1947 (now Patent No. 2,455,111, issued November 30, 1948).

A principal object of the present invention is to provide resilient means associated with the dark chamber for bearing on the sheets and preventing separation of the two sheets prior to the completion of the processing thereof by the spread layer of liquid existing between these two sheets.

Another object of the invention is to provide such resilient bearing means which do not interfere with the removal of the processed picture area.

Still another object of the invention is to provide such resilient bearing means which exert a relatively low frictional force on the two sheets as they are moved into their position within the dark chamber.

These and other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

Fig. 2 is an enlarged, fragmentary plan view of a portion of the rear door of the camera; and Fig. 3 is an enlarged, diagrammatic, fragmentary, sectional view of a portion of Fig. 1, the section of Fig. 3 being taken along the center line of the camera.

Figure 1:
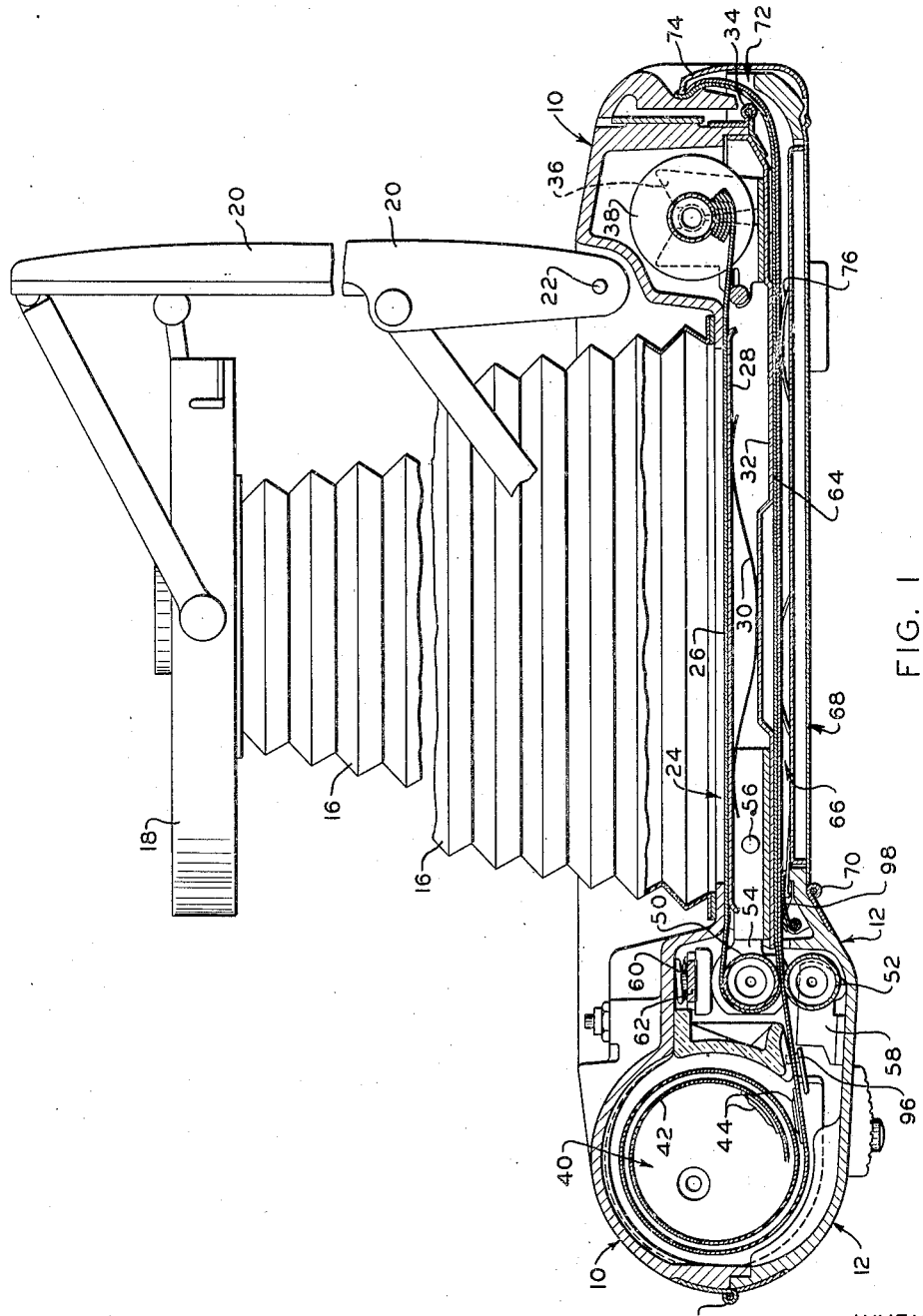
Figure 1 is a diagrammatic, fragmentary, sectional view of one preferred modification of the invention as embodied in a hand-held camera.

In a preferred type of hand-held camera embodying the present invention and illustrated in the drawings, the camera comprises a front housing, a rear housing and a partition extending between these two housings. Means are positioned in the camera for holding the two sheets. In a preferred form, there is one such means adjacent one end of the camera for holding a supply, such as a roll, of the photosensitive film and means are provided, preferably adjacent the other end of the camera, for holding a supply, such as a second roll, of sheetlike material. One of these two rolls of material preferably supports a plurality of liquid-carrying containers. An exposure opening is provided in the front housing and a door is included in the rear housing, the partition defining an exposure chamber with the front housing and defining a dark chamber with the rear housing, the door serving to provide access to the dark chamber. The camera also includes a processing means, preferably comprising a pair of pressure-applying members, positioned between the exposure opening and the second roll-holding means and arranged to release the processing liquid from the container and to spread this released liquid between the two sheets upon movement of the sheets in superposition between the pressure-applying members.

This invention is primarily directed to means associated with the dark chamber for making certain that the two sheets being processed in the dark chamber remain in contact with the spread liquid over their entire area during the processing thereof. In certain cases the container has a delaminating effect upon the sandwich comprising the two sheets and the layer of spread liquid. This is partially due to residual curvature in the containers when they have been stored, with their associated sheet, in roll form. Additionally, the thickness of the empty container near the adjacent edge of the exposed area of the film seems to have a delaminating effect. This is particularly noticeable at the margins of the two sheets in the neighborhood of the container, since the liquid is not released from the container at each margin of the sheets but is gradually spread towards these margins by the pressure members.

The present invention is directed primarily to the end of overcoming this delamination in the neighborhood of the container. Means for accomplishing this purpose preferably comprise resilient means arranged to bear on the marginal portions of the two sheets adjacent the container mouth when these two sheets are positioned within the dark chamber. In a preferred form of the invention, the dark chamber is defined by a pair of parallel, spaced walls and one of these walls carries a pair of springs which constitute the resilient means referred to above.

In a preferred process, the second sheet comprises an image-carrying sheet which has a positive image formed on its surface, the areas thereof adapted to carry this positive image being preferably defined by perforations which assist in the tearing out of these image area portions from the remainder of the sheet. In the normal use of the camera, when the two sheets are processed, this image area portion is positioned in superposition with the door so that, when the door is opened, this positive image area portion may be removed from the remainder of the image-carrying sheet by tearing along the perforations and without advancing the processed positive image from the camera. The two springs which are adapted to bear on the marginal portions of the laminated sheets are preferably carried by this door. This preferred form of the invention has the advantage that the resilient means do not interfere with the removal of the positive image.

Referring now to the various figures, there is shown one preferred form of the invention as embodied in a hand-held camera. This camera comprises a front housing 10 and a rear housing 12 pivotally connected thereto by a hinge 14. The front housing 10 has secured thereto a bellows 16 and a lens and shutter assembly schematically indicated at 18. A front cover 20, pivotally secured at 22 to front housing 10, suitably supports the lens and shutter assembly 18 in proper spaced relationship to the camera body. An exposure opening 24 of the front housing 10 permits exposure of a predetermined area of a photosensitive sheet 26 supported behind this opening 24 by means of a backing plate 28. Backing plate 28 is supported by a spring member 30 on a partition 32 which is hinged, as at 34, to the front housing 10. Also preferably carried by the partition 32 is a spool holder 36 carrying a spool 38 of the photosensitive film 26. At the other end of the camera there is provided a chamber 40, preferably defined by front housing 10 and rear housing 12, for holding a roll of image-carrying sheet 42. A plurality of containers 44, releasably carrying a processing liquid 45 (Fig. 3), are shown as being secured at spaced intervals to sheet 42. The image-carrying sheet 42 includes a plurality of image area portions 46 (see Fig. 2), each image area portion 46 being defined by a plurality of perforations 48. The processing means, which are shown in a preferred form as being positioned between the end of the exposure opening and the holder for the image-carrying sheet 42, comprise a pair of pressure-applying members such as a pair of pressure rolls 50 and 52. Roll 50 is preferably carried by a pair of arms 54 pivotally mounted on the partition 32, as by means of pivot pins 56, and pressure roll 52 is preferably rigidly secured to rear housing 12, such as by means of brackets 58. A spring 60 and a pressure bar 62 apply a resilient load on the two rolls when they are in the position shown in Fig. 1.

The rear surface 64 of the partition 32 defines a dark chamber 66 with a facing surface of the rear housing 12, a major portion of this latter surface being formed by a rear door 68. The rear door 68 is hinged at 70 to the rear housing 12 and provides access to the dark chamber 66. A discharge opening 72, in the right-hand end of the dark chamber 66, is normally closed by means of a cutter bar 74 positioned exteriorly thereof, this cutter bar 74 being arranged to permit severance of those portions of the two sheets which serve as leaders for moving a succeeding image area into the dark chamber.

As seen in greater detail in Fig. 3, the dark chamber 66 is preferably quite shallow and the resilient means referred to above are positioned so as to provide marginal portions of the dark chamber that are constricted with respect to the rest of this chamber. The resilient means are shown in a preferred form as comprising a pair of springs 76, each of these springs being preferably mounted on the rear door 68 by means of a pair of rivets 78 and 80. The arrangement of the mounting for the springs is such that a sheet-engaging surface 77 on each spring 76 may move normally to the sheet and one of the ends of each spring may also move along with the sheet to a limited extent when a thicker portion of the lamination, e. g. a portion including one of the containers, passes spring 76. This preferred mounting by the rivets 78 and 80 is accomplished by having the leading end of this spring 76, the left-hand end as viewed in the drawings, fixedly secured to the rear door by rivet 78 and by having the trailing end of the spring 76 slidably secured to the rear door by the rivet 80. The sliding relationship is preferably achieved by providing an elongated rivet-engaging hole 82 in the spring 76 through which the rivet 80 passes. As a consequence of this construction, the maximum deformation of the spring is limited by the center of the spring touching the flat surface of the door, thus preventing it from being accidentally stressed beyond its elastic limit. This arrangement also provides a mounting for the springs 76 which permits full utilization of the resilience of the springs while obviating the danger of catching either end of the springs on any article of clothing or other obstruction.

As seen best in Figs. 2 and 3, the rear door 68 comprises a forward section 84 and a rear section 86, the springs 76 being secured to the forward surface of section 84, this forward surface constituting that surface which, with the rear surface 64 of the partition, defines the shallow dark chamber 66. The forward section 84 preferably includes reinforcing ridges 85. A latch 88 is also carried by the rear door and an operating member 90, for actuating the latch 88, is held in place by the two sections of the rear door. The operating member 90 includes, in a preferred form, an extension 91 which engages a pair of detents 93 formed in the forward section 84 so as to hold the latch in either operative or inoperative position.

In a preferred form of image-carrying sheet 42 there is provided an initial tear-out portion 92 which is accessible to the camera user when the rear door 68 is opened. This initial tear-out portion is associated with an initial tear-out hole 94 through which a fingernail may be inserted to initiate the removal of the processed positive image. These last-mentioned portions of the image-carrying sheet are shown in dotted lines in Fig. 2 in their relationship with the image area portion 46 and the container 44.

A preferred form of camera comprises a die-cast aluminum body whose interior is painted black. The springs 76 may be formed of Phosphor bronze, nickel silver, or beryllium copper.

In the use of the camera described above, the camera is first opened by rotating the rear housing 12 around the hinge 14 and then swinging the partition 32 around its hinge 34 to expose spool holder 36. The spool 38, carrying a roll of photosensitive film 26, is inserted in the spool holder 36 and the leader portion of the film is led across the backing plate 28, positioned between the arms 54 and led around pressure roll 50. The roll of image-carrying sheet 42 is positioned in the holding chamber 40 and the partition 32 is then moved to the position shown in Fig. 1. The leader portion of the image-carrying sheet is aligned with the leader portion of the photosensitive sheet 26, if they are not already aligned, and these two leaders are guided along the rear surface 64 of the partition 32 till they extend from the right-hand end of the camera. Rear housing 12 is then moved to closed position, thus bringing the pressure roll 52 into operative relationship with the pressure roll 50. The leaders of the two sheets are then pulled till the first photosensitive area of the photosensitive sheet 26 is in exposure position behind the exposure opening 24, this positioning being indicated by a stop 96 or other means, such as suitable marks on the leader. This movement of the leaders advances the corresponding portion of the image-carrying sheet 42 from the holder 40 so that a container 44 is just about to enter the bite of the pressure rolls 50, 52. The excess leader stock may now be torn off by moving the cutter bar 74 to the position shown and tearing the leader stock against the cutter bar 74. Exposure is now made and the two sheets are pulled by moving the cutter bar 74, releasing the stop 96 and grasping the two portions of the leader under the cutter bar. The pulling movement of the two leaders releases and spreads processing liquid 45 between the two sheets and laminates these two sheets together. As this spreading takes place the sheets are advanced into the dark chamber 66. When the two laminated sheets have been moved into the position shown in Figs. 2 and 3 they are preferably stopped from further movement by means of the stop 96 engaging a suitable hole in the image-carrying sheet 42. During the movement of the sheets into the position shown, the tension on the sheets helps to prevent separation thereof adjacent the container, even though the container may be under considerable stress due to residual curvature in the container material. When the sheets reach the position shown, the springs 76 engage the outer surface of the image-carrying sheet and press this sheet tightly against the layer of spread liquid 45 and the photosensitive sheet 26. The photosensitive sheet is held against the force of springs 76 by the rear surface 64 of the partition 32. Thus, when the pulling tension on the sheets is released, the marginal portions of the sheets adjacent the container mouth are firmly pressed together, thereby resisting any tendency on the part of the container to separate these sheets even though the container may be under considerable stress. Due to the smooth surfaces and the gradual engagement of the left-hand end of the surfaces 77, on the springs 76, with the advancing sheet these springs do not materially add to the force required to pull the two sheets between the processing rolls 50 and 52. The frictional force exerted by these springs is relatively minor with respect to the total frictional force encountered in the movement of the sheets through the remainder of the camera.

At the end of about a minute or so, when the processing of the sandwich comprising the two sheets and the layer of spread liquid is substantially completed and a positive image is formed on the inner surface of the image area 46, the latch 88 is released and the rear door is opened. The user then inserts a fingernail through the initial tear-out hole 94 and separates the processed positive image area from the remainder of the image-carrying sheet and the photosensitive sheet. Those portions of the two sheets 26 and 42 remaining in the camera are then used as leaders for the succeeding corresponding photosensitive and image-carrying areas. In a preferred form of the camera, a light-seal blade 98 is positioned adjacent the left-hand end of the door 68 and prevents actinic light from reaching unprocessed photosensitive film in the camera when the door 68 is opened.

While a preferred form of the invention has been described above it should be understood that numerous modifications of the specific construction shown may be accomplished without departing from the scope of the invention. For example, the image-carrying sheet may be transparent, in which case the two sheets may be formed into a single roll and the exposure of the photosensitive area may be accomplished by directing the exposure light through the image-carrying sheet. With this arrangement, a positive transparency is easily obtained on the image-carrying sheet. Equally, different processing materials may be employed and the invention may be employed in other types of cameras such as photocopy machines where no lens system is employed.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera comprising a housing, means for holding a supply of photosensitive sheet and a supply of a second sheet, one of said two sheets supporting a plurality of spaced liquid-carrying containers, portions of said housing defining an exposure chamber, an exposure opening in said housing communicating with said exposure chamber, other portions of said housing defining a dark chamber, processing means comprising a pair of pressure-applying members positioned adjacent said exposure opening and arranged to release a processing liquid from one of said containers and spread said released liquid between said two sheets upon movement of said sheets in superposition between said pressure-applying members and into said dark chamber, and resilient means positioned in said dark chamber adjacent the path followed by the marginal portions of said superposed sheets as they are advanced into said dark chamber, said resilient means being arranged to bear on the margins of one of said sheets and hold said sheet in laminated engagement with said other sheet, said other sheet being supported by said chamber-defining means adjacent that portion of the surface thereof corresponding to that portion of the surface of the other sheet engaged by said resilient means.

2. A camera comprising a housing, means for holding a supply of photosensitive sheet and a supply of a second sheet, one of said two sheets supporting a plurality of spaced liquid-carrying containers, portions of said housing defining an exposure chamber, an exposure opening in said housing communicating with said exposure chamber, a first wall, a second wall, said two walls being closely spaced and defining therebetween a dark chamber, and processing means comprising a pair of pressure-applying members positioned adjacent said exposure opening and arranged to release a processing liquid from one of said containers and spread said released liquid between said two sheets upon movement of said sheets in superposition between said pressure-applying members and into said dark chamber, said first wall including resilient means positioned in said dark chamber adjacent the path followed by the marginal portions of said superposed sheets as they are advanced into said dark chamber, said resilient means comprising predetermined limited surface portions which correspond to marginal portions of said sheets and are spaced closer to said second wall than the remainder of said first wall, said limited surface portions being arranged for resilient movement with respect to the remainder of said first wall and said second wall.

3. A camera comprising a housing, means for holding a supply of photosensitive sheet and a supply of a second sheet, one of said two sheets supporting a plurality of spaced liquid-carrying containers, portions of said housing defining an exposure chamber, an exposure opening in said housing communicating with said exposure chamber, other portions of said housing defining a dark chamber, and processing means comprising a pair of pressure-applying members positioned adjacent said exposure opening and arranged to release a processing liquid from one of said containers and spread said released liquid between said two sheets upon movement of said sheets in superposition between said pressure-applying members and into said dark chamber, said portions of said housing defining said dark chamber including resilient means positioned in said dark chamber adjacent the path followed by the marginal portions of said superposed sheets as they are advanced into said dark chamber, said resilient means comprising a pair of members defining therebetween a portion of said path which is constricted in a direction normal to the sheet surfaces and means resiliently mounting one of said members.

4. A camera comprising a housing, means for holding a supply of photosensitive sheet and a supply of a second sheet, one of said two sheets supporting a plurality of spaced liquid-carrying containers, portions of said housing defining an exposure chamber, an exposure opening in said housing communicating with said exposure chamber, a first wall, a second wall, said two walls being closely spaced and defining therebetween a dark chamber, and processing means comprising a pair of pressure-applying members positioned adjacent said exposure opening and arranged to release a processing liquid from one of said containers and spread said released liquid between said two sheets upon movement of said sheets in superposition between said pressure-applying members and into said dark chamber, said first wall including resilient means positioned in said dark chamber adjacent the path followed by the marginal portions of said superposed sheets as they are advanced into said dark chamber, said resilient means comprising a pair of springs associated with said first wall and extending into the space between said walls, said springs being spaced from said second wall by a distance less than the thickness of the sandwich comprising said two sheets and the spread layer of liquid.

5. A camera comprising a housing, means for holding a supply of photosensitive sheet and a supply of a second sheet, one of said two sheets supporting a plurality of spaced liquid-carrying containers, portions of said housing defining an exposure chamber, an exposure opening in said housing communicating with said exposure chamber, a first wall, a second wall, said two walls being closely spaced and defining therebetween a dark chamber, and processing means comprising a pair of pressure-applying members positioned adjacent said exposure opening and arranged to release a processing liquid from one of said containers and spread said released liquid between said two sheets upon movement of said sheets in superposition between said pressure-applying members and into said dark chamber, said first wall including resilient means positioned in said dark chamber adjacent the path followed by the marginal portions of said superposed sheets as they are advanced into said dark chamber, said resilient means comprising a pair of springs associated with said first wall and extending into the space between said walls, said springs being spaced from said second wall by a distance less than the thickness of the sandwich comprising said two sheets and the spread layer of liquid, that end of each spring closest to said pressure-applying members being fixedly secured to said first wall, the other end of each spring being mounted for movement along said first wall in the direction of movement of said sheets within said dark chamber.

6. A camera comprising a housing, means for holding a supply of photosensitive sheet and a supply of a second sheet, one of said two sheets supporting a plurality of spaced liquid-carrying containers, portions of said housing defining an exposure chamber, an exposure opening in said housing communicating with said exposure chamber, a first wall, a second wall, said two walls being closely spaced and defining therebetween a dark chamber, processing means comprising a pair of pressure-applying members positioned adjacent said exposure opening and arranged to release a processing liquid from one one said containers and spread said released liquid between said two sheets upon movement of said sheets in superposition between said pressure-applying members and into said dark chamber, said first wall including resilient means positioned in said dark chamber adjacent the path followed by the marginal portions of said superposed sheets as they are advanced into said dark chamber, said resilient means comprising predetermined limited surface portions which correspond to marginal portions of said sheets and are spaced closer to said second wall than the remainder of said first wall, said limited surface portions being arranged for resilient movement with respect to the remainder of said first wall and said second wall, and a door providing access to said dark chamber, the inner surface of said door comprising a portion of one of said two dark chamber-defining walls.

7. A camera comprising a housing, means for holding a supply of photosensitive sheet and a supply of a second sheet, said second sheet comprising an image-carrying sheet including a plurality of image areas and a plurality of spaced liquid-carrying containers associated therewith, portions of said housing defining an exposure chamber, an exposure opening in said housing communicating with said exposure chamber, other portions of said housing defining a dark chamber, processing means comprising a pair of pressure-applying members positioned adjacent said exposure opening and arranged to release a processing liquid from one of said containers and spread said released liquid between said two sheets upon movement of said sheets in superposition between said pressure-applying members and into said dark chamber, resilient means positioned in said dark chamber adjacent the path followed by the marginal portions of said superposed sheets as they are advanced into said dark chamber, said resilient means being arranged to bear on the margins of one of said sheets and hold said sheet in laminated engagement with said other sheet, said other sheet being supported by said chamber-defining means adjacent that portion of the surface thereof corresponding to that portion of the surface of the other sheet engaged by said resilient means, and a stop for predeterminedly positioning said sheets in said chamber, said resilient means being positioned to engage said image-carrying sheet closely adjacent that edge of an image area nearest its associated container when said sheets are predeterminedly positioned by said stop.

MURRY N. FAIRBANK.

REFERENCES CITED

The following references are of record in the file of this patent:

UNITED STATES PATENTS

| Number | Name | Date |
| --- | --- | --- |
| 2,336,278 | Mihalyi | Dec. 7, 1943 |